United States Patent [19]

Wadell et al.

[11] Patent Number: 5,137,493
[45] Date of Patent: Aug. 11, 1992

[54] CORN HUSKING MACHINE

[75] Inventors: Lars G. A. Wadell, Aengelholm; John I. G. Wikstroem, Bjuv, both of Sweden

[73] Assignee: Nestec S.A., Vevey, Switzerland

[21] Appl. No.: 803,776

[22] Filed: Dec. 5, 1991

Related U.S. Application Data

[63] Continuation of Ser. No. 478,842, Feb. 12, 1990, abandoned.

[30] Foreign Application Priority Data

Mar. 4, 1989 [EP] European Pat. Off. ............ 89103818
Aug. 12, 1989 [EP] European Pat. Off. ............ 89114948

[51] Int. Cl.$^5$ .................. A01F 11/00; A01F 11/06
[52] U.S. Cl. ................................ 460/29; 460/30; 460/34; 460/35; 460/42
[58] Field of Search .................... 460/26, 29–31, 460/33–35, 42; 56/103

[56] References Cited

U.S. PATENT DOCUMENTS

| | | | |
|---|---|---|---|
| 1,000,984 | 8/1911 | Blee et al. | 460/29 |
| 1,201,476 | 10/1916 | Leister et al. | 460/35 |
| 1,463,364 | 7/1923 | Knapp | 460/29 |
| 2,818,072 | 12/1957 | Jones | 460/29 |
| 2,845,932 | 8/1958 | Jones | 460/29 |
| 3,101,720 | 8/1963 | Karlsson | 460/31 |
| 3,113,574 | 12/1963 | Greedy et al. | 460/35 |
| 3,900,036 | 8/1975 | Anderson et al. | 460/29 |

Primary Examiner—Stephen J. Novosad
Attorney, Agent, or Firm—Vogt & O'Donnell

[57] ABSTRACT

A corn husking machine has a hollow cylindrical drum defined by a circumferential wall rotatable about a substantially horizontal longitudinal axis. The drum wall has at least one aperture therethrough which is suitable for unhusked ears of corn to pass through from outside the drum to the hollow interior of the drum. A station is affixed to an interior portion of the drum wall adjacent each aperture and extends into the hollow of the drum. Each station has two elongated rollers positioned side by side, which are rotated in opposite directions, so that at a nip formed by adjacent surfaces of the rollers, husks of unhusked ears of corn passed through the adjacent aperture are seized by the rotating rollers and stripped off the ears and pulled between and through the nip. The husks are collected in a central portion of the hollow of the drum. For husking ears of minicorn, the rollers have a diameter of from 1 cm to 3 cm and are rotated at a speed of from 20 rpm to 250 rpm.

13 Claims, 7 Drawing Sheets

CORN HUSKING MACHINE

Cross-Reference to Related Applications

This application is a continuation of U.S. patent application, Ser. No. 07/478,842, filed Feb. 12, 1990, now abandoned.

BACKGROUND OF THE INVENTION

The present invention relates to a machine for removing the husks from minicorn.

When the husks are removed from ears of corn manually, the rate of production of dehusked cobs by one person is only about 2 kg/hour.

Machines are known for removing the husks from ordinary sized ears of corn, e.g., the machines described in U.S. Pat. No. 3113574 or in U.S. Pat. No. 3900036. In these machines, the husks are stripped from the ears by passing onto the upper surface of a pair of cooperating fluted or cogged husking rollers moving in the opposite direction and downwardly at their point of contact, whereby the husks are gripped and stripped from the ears and fall between the rollers. The rollers usually have a diameter of about 5 cms and rotate at a speed of about 500 rpm. While such machines may be satisfactory for ordinary sized ears of corn having a length of about 20 cms and a diameter of about 5 cms, the action of the fluted rollers rotating at such high speeds can cause damage to the less robust and smaller ears of minicorn which have a length of about 8–10 cms and a diameter of about 1.5 to 2.0 cms.

SUMMARY OF THE INVENTION

We have now devised an apparatus for removing the husks from minicorn which can produce dehusked cobs at a rate of as much as from 15 to 20 kg/hour without causing any substantial damage to the minicorn using smaller rollers having a diameter of from 1 to 3 cms revolving at a slower speed of from 20 to 250 rpm.

Accordingly, the present invention provides a minicorn husking machine comprising:

a hollow drum capable of revolving about a substantially horizontal longitudinal axis, at least one station fixed around the circumference of the drum comprising a pair of cooperating rollers each having a diameter of from 1 to 3 cms with their axes positioned substantially parallel to the longitudinal axis of the drum and which travel around the circumference of the drum as it rotates so that they lie in substantially side by side relationship at the apex and the base of the drum, means for rotating the rollers at a speed from 20 to 250 rpm in opposite directions so that they travel downwards at their point of contact when at the apex of the drum, means for feeding ears of minicorn to the upper surface of the rollers when they are positioned roughly in the arc at the upper third of the drum such that in operation the husks from the ears of the minicorn are seized by the rotating rollers, stripped off the cobs and pulled through the nip between the rollers leaving the cobs lying on top of the rollers, and means for collecting the husks and means for collecting the cobs.

DESCRIPTION OF PARTICULAR EMBODIMENTS

In the present invention, the diameter of the drum may vary widely may conveniently be from 25 to 200 cms but preferably from 50 to 100 cms. The speed of rotation of the drum may also vary considerably and may be from 0.5 to 10 rpm but more usually from 1 to 5 rpm.

The diameter of each roller is preferably from 1.5 to 2.5 cms. The speed of rotation of the rollers is preferably from 30 to 150 rpm and especially from 40 to 100 rpm. The cooperating rollers should be capable of gripping the husks of corn powerfully enough to strip them off the cobs and pull them through the nip. Each roller may consist of a metal shaft enclosed by a soft, flexible plastics or rubber material in which case they may be relatively smooth-walled, i.e., free from cogs, flutes or other projections. Alternatively, each roller may be a relatively strong metallic spring, the surface of which is advantageously machined to provide shallow spiral splines, e.g., having a depth of from 1 to 3 mm. The metal used is preferably steel and should have a degree of elasticity enabling the rollers to pull the husks of corn through the nip.

Since part of the husks may stick to the rollers after having been pulled through the nip, advantageously a scraping means is positioned for scraping the surfaces of the rollers facing the center of the drum.

Advantageously, there are several stations around the circumference of the drum to which is fixed a pair of cooperating rollers, e.g., from 3 to 20, preferably from 5 to 15.

The means for collecting the husks is advantageously a horizontal conveyor belt traversing the hollow interior of the drum in a longitudinal direction.

The means for collecting the cobs after the ears have been stripped of their husks may be provided by a means for receiving the cobs as they fall by gravity off the upper surface of the rollers as the drum continues to rotate after the stripping e.g. a receptacle or a conveyor belt suitably positioned below the point where the cobs fall off.

The present invention is further illustrated by example only with reference to the accompanying drawings.

DETAILED DESCRIPTION OF THE DRAWINGS

Figure 1:
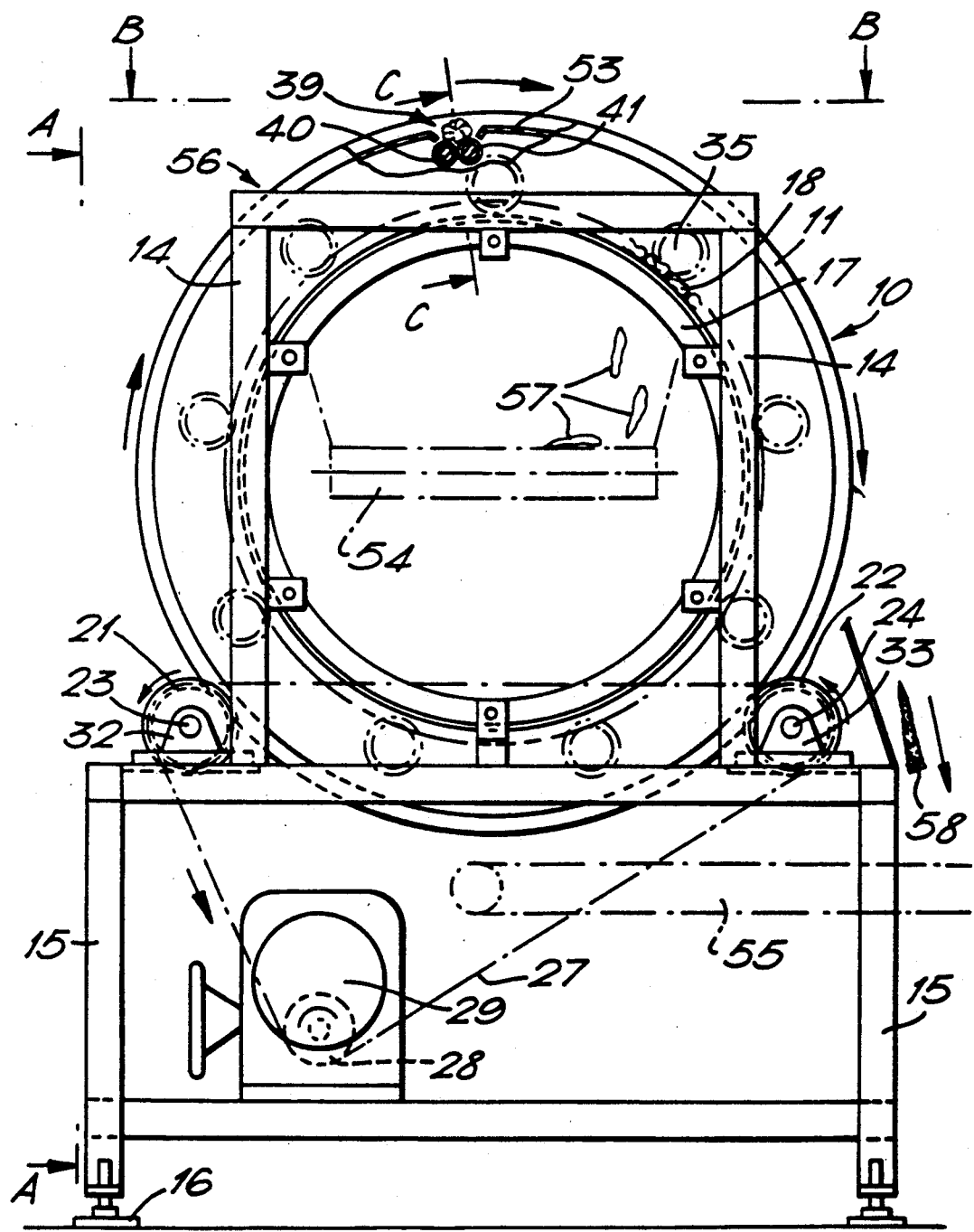
FIG. 1 is a diagrammatic end elevation of a machine according to the present invention.
Figure 2:
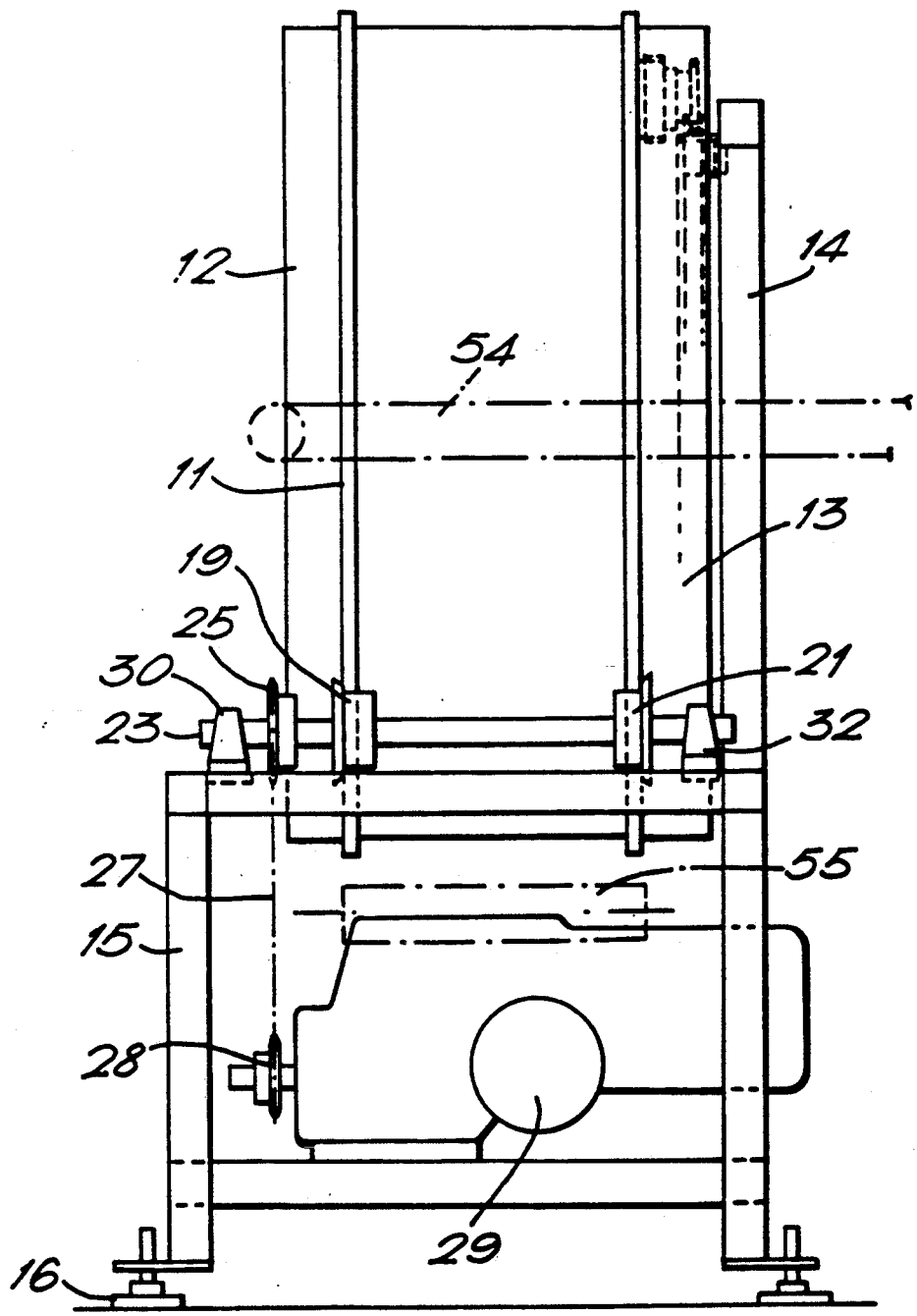
FIG. 2 is a side sectional view of the machine illustrated in FIG. 1, taken along the lines A—A looking in the direction of the arrows from the left.
Figure 3:
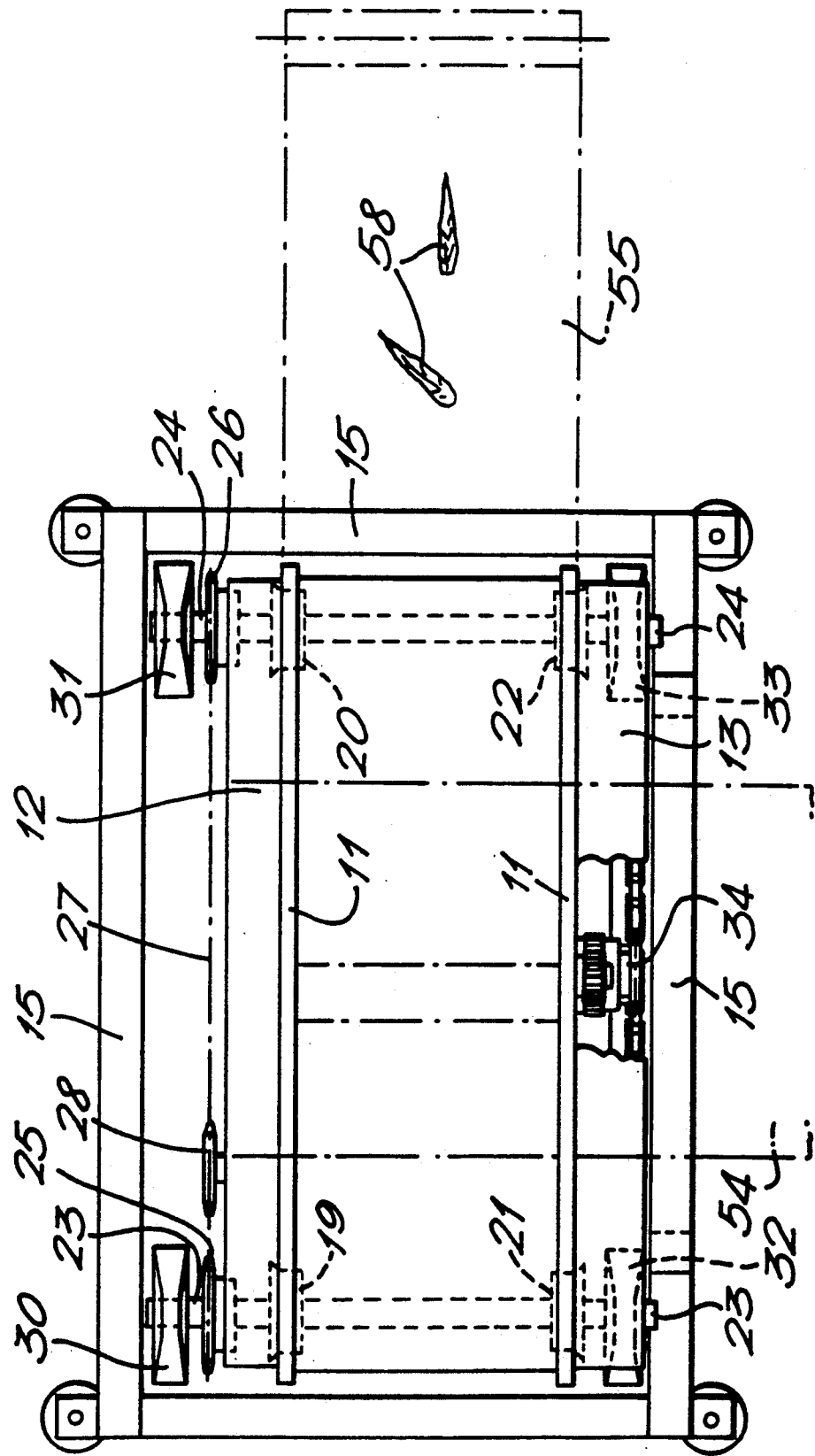
FIG. 3 is a top plan view of the machine illustrated in FIG. 1, taken along the lines B—B.

Referring to the drawings, and in particular to FIGS. 1-3, the machine comprises a stripping drum of diameter 75 cms, generally designated 10, having circumferential wall 11, covers 12, 13 (see FIG. 3), a frame having an upper part 14 and a lower part 15, resting on feet 16, to which is fixed a stationary ring 17 and a chain 18 which encircles the ring. The stripping drum rests on four rail wheels 19,20,21,22 having axles 23,24 driven by chain wheels 25,26 (see FIG. 3), respectively attached by means of a chain 27 to chain wheel 28 driven by a variator 29 which may vary the speed. The wheels 21,22 are driven through the axles 23,24 respectively which are journalled in bearings 30,31,32,33.

Figure 9:
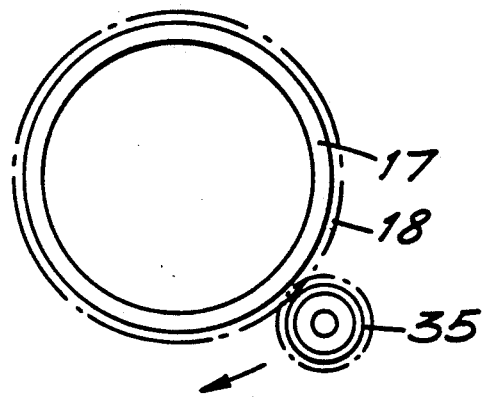
FIG. 9 is a cross-sectional view of a part of the machine of FIG. 1.
Figure 8:
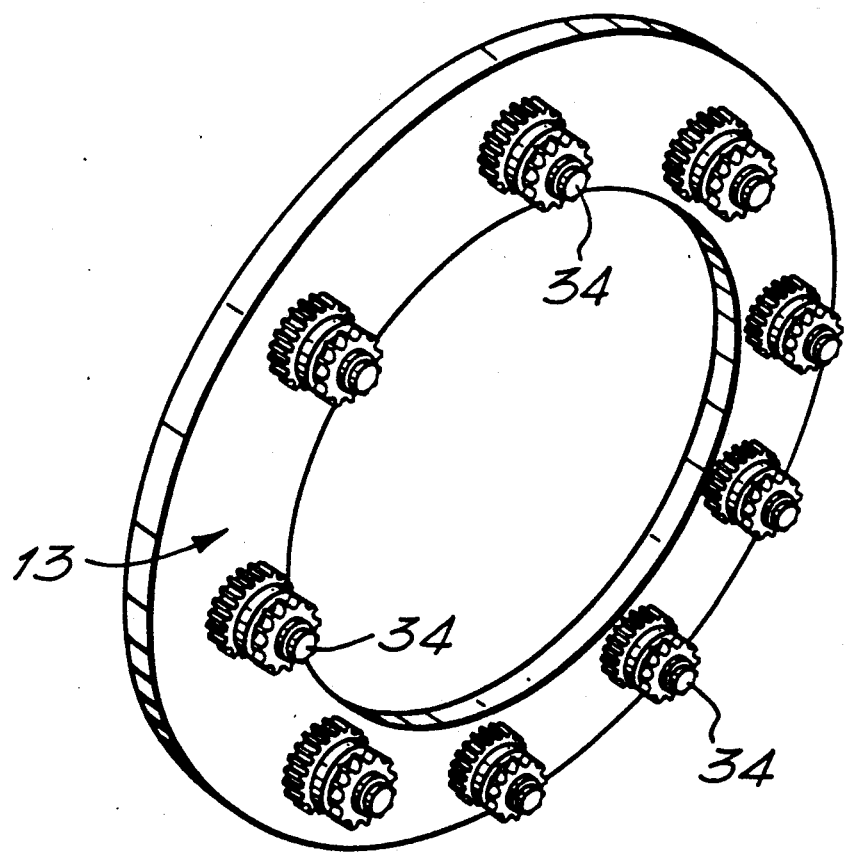
FIG. 8 is an end view of the drum.
Figure 1:
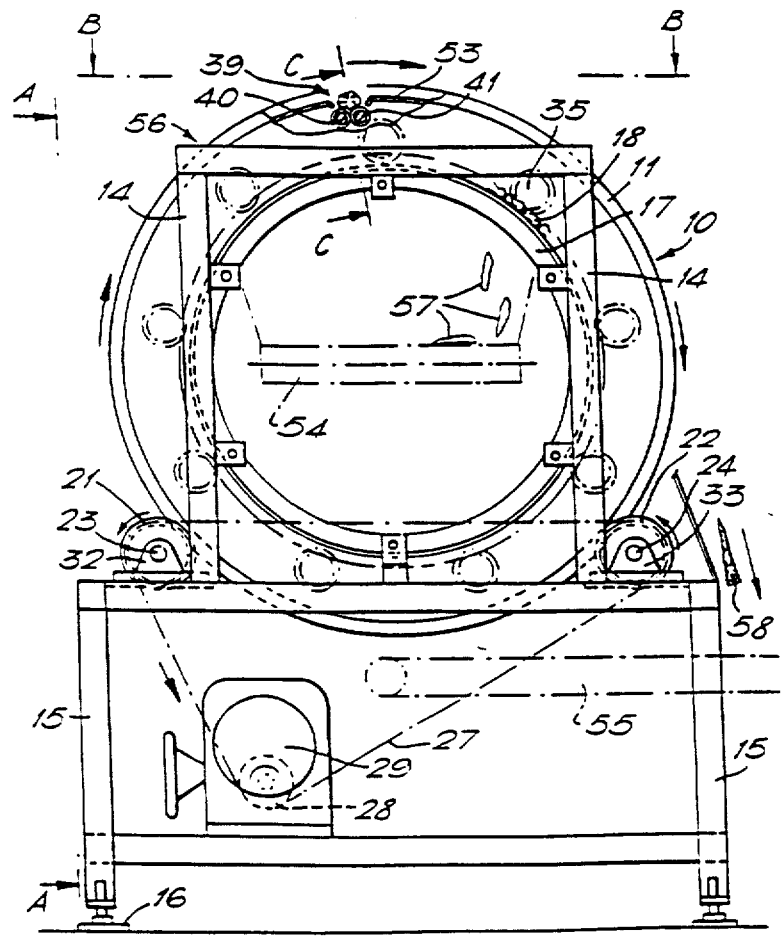
Figure 5:
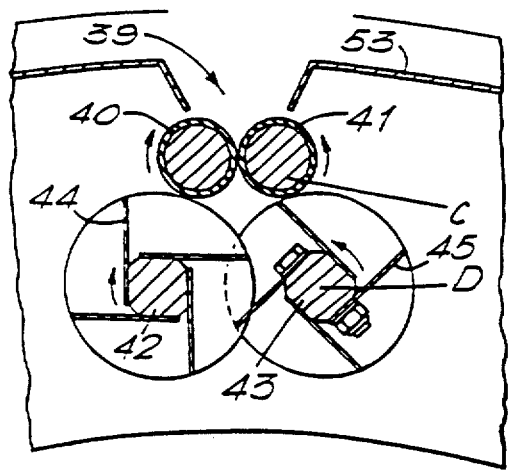
Figure 6:
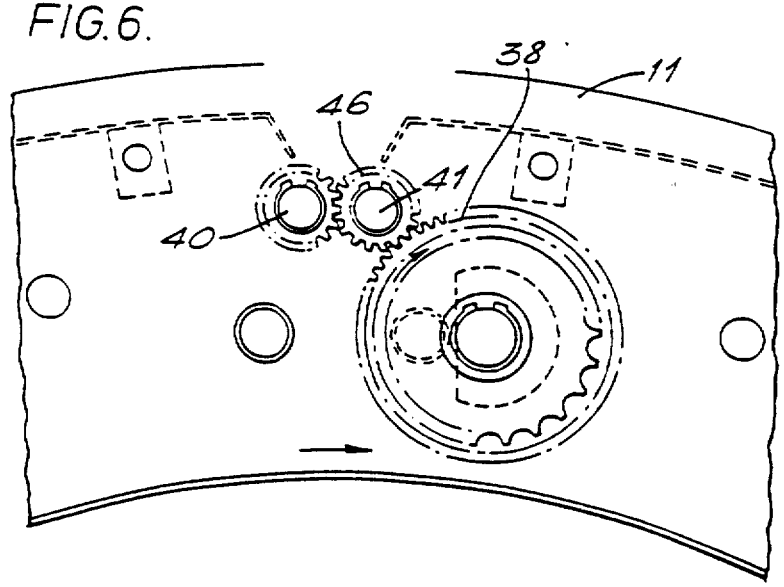

As illustrated by FIGS. 1, 3, 4 and 8, nine shaft pivots 34 are mounted in one end of the drum on each of which is mounted a sprocket 35 via a ring 36 and a disc 37, linked to a gear wheel 38 both being free running on the pivot 34. The stationary ring 17 is encircled by the chain 18 on the outside of which rotate the sprockets 35 as further illustrated in FIG. 9.

Figure 5:
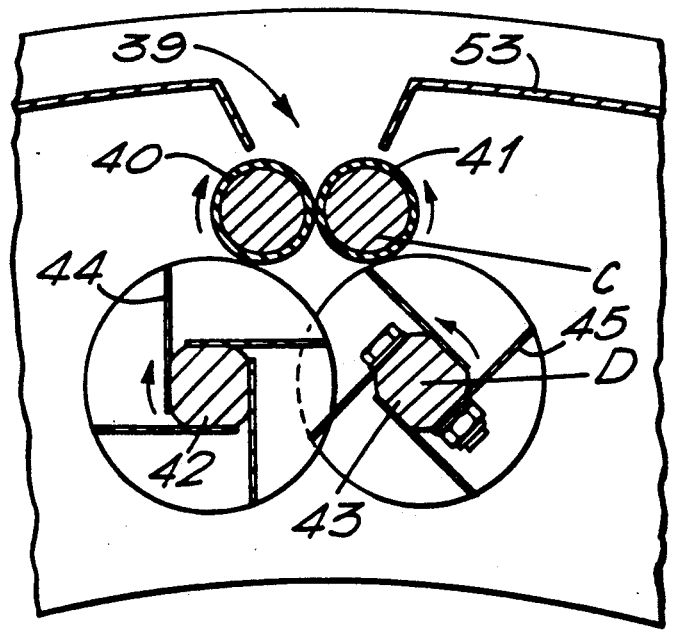
FIG. 5 is a cross section taken along lines D—D of FIG. 4.
Figure 6:
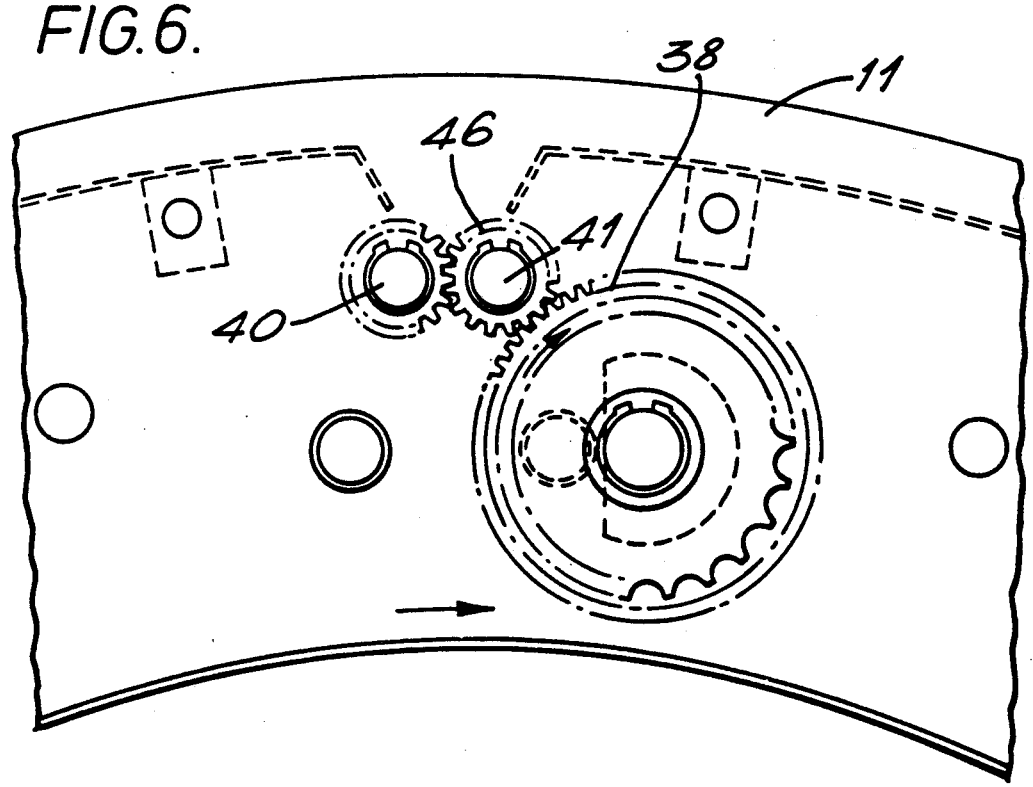
FIG. 6 is an end view of FIG. 4 looking in the direction E.

The stripping drum illustrated in FIG. 1 contains nine stripping stations generally designated 39. Each stripping station, as illustrated in FIG. 5, consists of a pair of elongated rubber rollers 40, 41, each of diameter 2.2 cms, and a pair of scraper shafts 42, 43 each provided with four scraper blades 44, 45 respectively. As illustrated in FIG. 6, the gear wheel 38 is in contact with a pinion 46 which contacts the rubber roller 40 and causes the rollers 40, 41 to rotate.

As illustrated, each station is affixed to an interior portion of the drum wall, and each station is adjacent an aperture in the drum wall which is suitable for unhusked ears of corn to pass through from outside the drum to the station which extends into the hollow interior of the drum. As the drum rotates, the two rollers of the stations have a substantially horizontal transverse axis at the apex of the drum.

Figure 7:
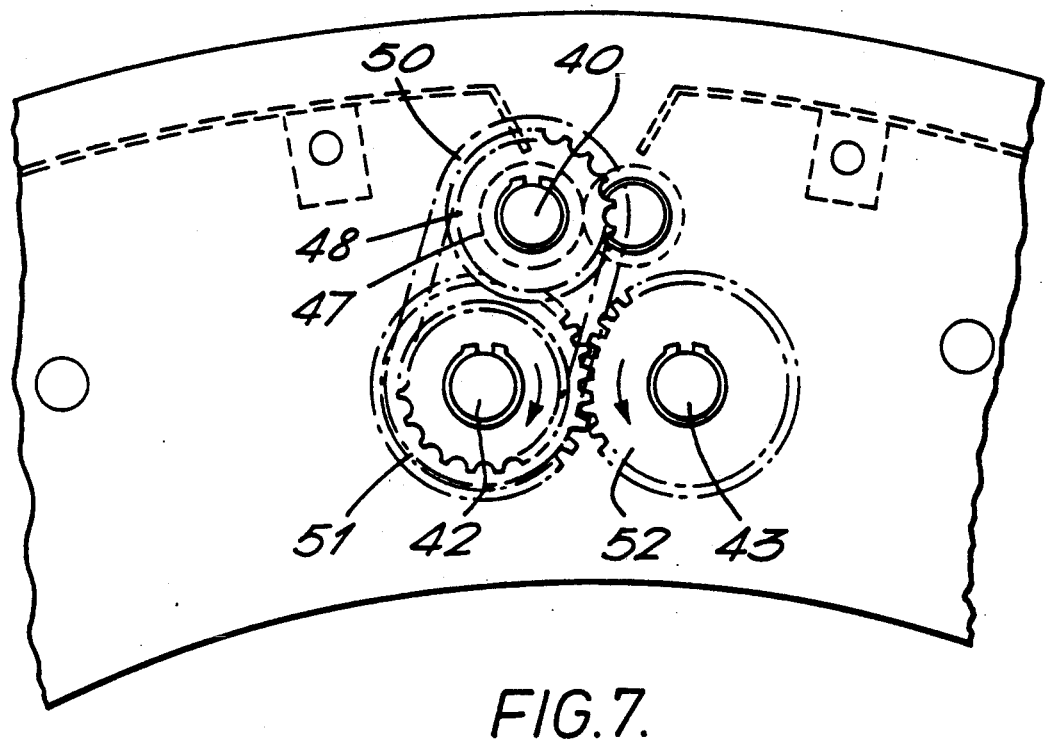
FIG. 7 is an end view of FIG. 4 looking in the direction F.

At the other end of the drum, as illustrated in FIG. 7, the axis of the other end of roller 40 actuates the scraper shafts by means of a chain wheel 47 in contact with a pinion 48 linked to another chain wheel 49 by means of a chain 50. The chain wheel 49 (see FIG. 4) is linked to a pinion 51 (see FIG. 7) encircling the scraper shaft 42 while the pinion 51 contacts a pinion 52 encircling the scraper axle 43.

Figure 4:
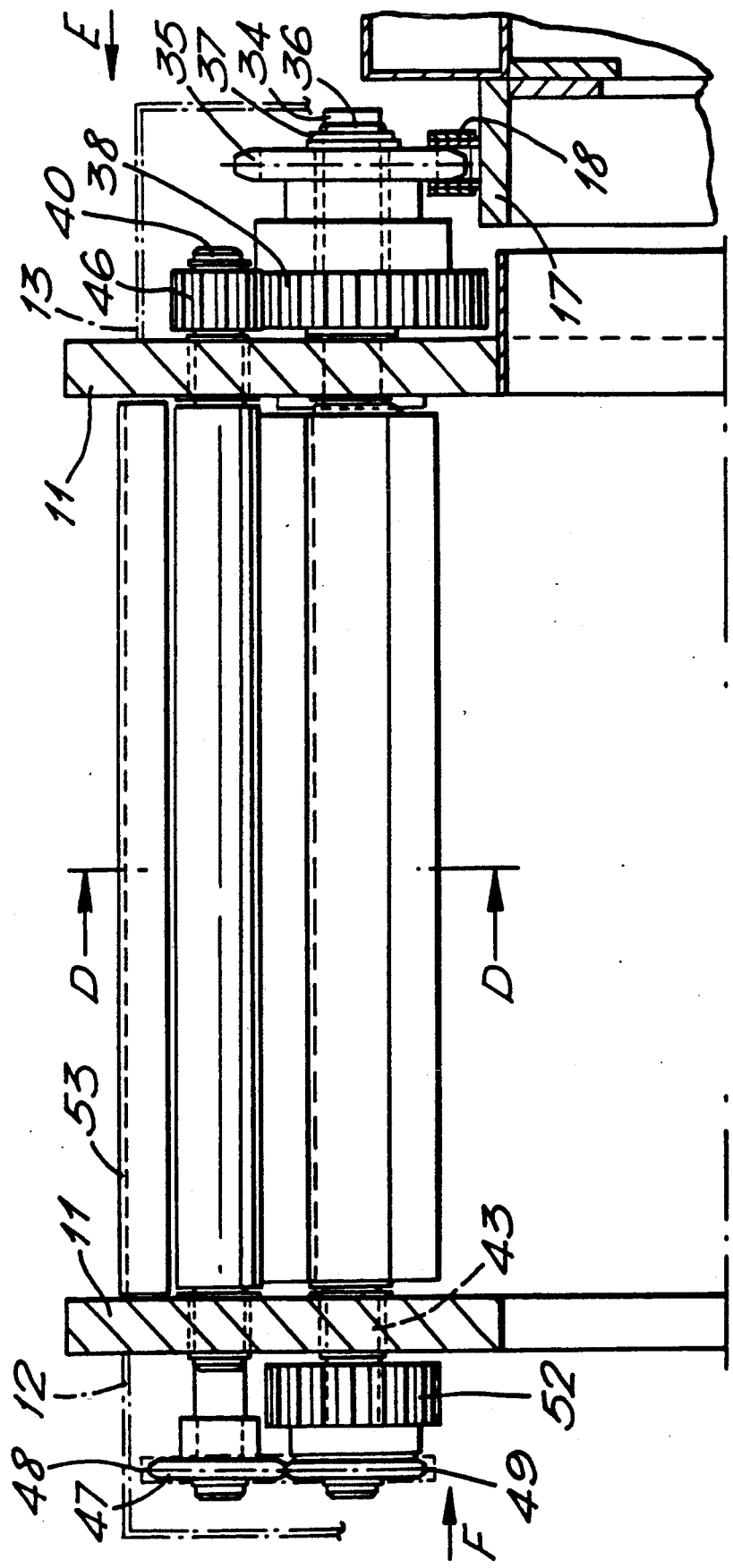
FIG. 4 is an enlarged side section of the length of part of the drum at a stripping station, taken along the lines C—C.

At each stripping station there is provided an intermediate plate 53 As illustrated in FIGS. 4 and 5. Traversing a central portion the center of the drum is a conveyor belt 54 and below the drum is a conveyor belt 55 as illustrated in FIGS. 1 and 2. The infeed point is indicated in FIG. 1 by reference numeral 56.

In operation the drum rotates at a speed of 4 rpm in the direction of the arrow depicted in FIG. 1 and is driven by the variator 29 which drives the chain wheel 28 which transmits the motion to the rail wheels 19, 20, 21, 22 by means of the chain 27 and chain wheels 25, 26, while the rail wheels 21, 22 are driven through the axles 23, 24 respectively. When the drum rotates, the sprocket 35 and the gear wheel 38, illustrated in FIG. 4, are rotated about and by the circumferential ring 17. Since the gear wheel 38 is in contact with the pinion 46, the rubber rollers rotate at 75 rpm which, in turn, actuate the scraper shafts to rotate.

Minicorn is fed at position 56 (FIG. 1) to a stripping station 39 and when a corn cob is placed onto the rubber rollers, the foliage of the cob is seized by the rollers and pulled between them. Below the rollers, the scraper blades 44, 45 of the rotating scraper shafts 42, 43 (FIG. 5) scrape off the foliage 57 from the rollers, which is collected on conveyor 54 while the cob 58 which lies on the rollers falls off onto conveyor belt 55 by gravity as the drum rotates.

More than 800 cobs can be stripped in one hour.

We claim:

1. A corn husking machine comprising:

a hollow cylindrical drum defined by a circumferential wall rotatable about a substantially horizontal longitudinal axis and having at least one aperture therethrough which is suitable for unhusked ears of corn to pass through from outside the drum to the hollow interior of the drum;

a station affixed to an interior portion of the drum wall adjacent each aperture and extending into the hollow of the drum comprising two elongated rollers positioned side by side and having a longitudinal axis substantially parallel to the longitudinal axis of the drum and comprising means for rotating the rollers in opposite directions so that at an apex of rotation of the drum, the two rollers have substantially horizontal longitudinal axes and so that at a nip formed by adjacent surfaces of the rollers, each roller travels downwards so that, in operation, husks of unhusked ears of corn passed through the adjacent aperture are seized by the rotating rollers, stripped off the ears and pulled between and through the roller nip;

means positioned at an upper outer portion of the drum wall for feeding unhusked ears of corn to the at least one drum aperture and the station adjacent each aperture for being husked;

means positioned in a central portion of the hollow of the drum for collecting the husks pulled off the ears by the rollers at each station; and means for collecting ears stripped of husks from the at least one aperture and adjacent station.

2. A machine according to claim 1 further comprising:

a supporting frame;

rail wheels connected to rotatable axles connected to the frame for supporting and rotating the drum; and means for driving the axles for rotating the rail wheels for rotating the drum.

3. A machine according to claim 1 or 2 wherein each station further comprises sprockets connected to the rollers for rotating the rollers and wherein the means for rotating the rollers comprises the sprockets and a stationary ring affixed to the frame mounted at one end of the drum having a circumference in contact with the sprockets so that upon rotation of the drum, the sprockets are rotated by the ring for rotating the rollers.

4. A machine according to claim 3 wherein the stationary ring further comprises a chain encompassing the ring for contacting the sprockets for rotating the rollers.

5. A machine according to claim 1 wherein each roller is comprised of a metal shaft enclosed by a material selected from a group of materials consisting of a flexible plastics material and a rubber material.

6. A machine according to claim 1 wherein each roller is comprised of a metallic spring having a surface of spiral splines.

7. A machine according to claim 1 further comprising a scraping means positioned adjacent a surface of the rollers facing the central portion of the drum for scraping the surfaces of the rollers.

8. A machine according to claim 1 wherein the means for collecting the husks is a conveyor.

9. A machine according to claim 1 wherein the means for collecting the ears stripped of husk is a conveyor.

10. A process for husking minicorn comprising:
rotating a hollow cylindrical drum about a substantially horizontal longitudinal axis of the drum, the drum being defined by a circumferential wall having at least one aperture therethrough which is suitable for unhusked ears of minicorn to pass through from outside the drum to a station for husking ears affixed to the drum wall adjacent each aperture in the interior of the drum and extending into the interior of the drum;
feeding ears of minicorn to the at least one aperture of the rotating drum to the adjacent station at an upper portion of the drum;
rotating two rollers of each station in opposite direction at a speed 20 rpm to 250 rpm, the rollers having a diameter of from 1 cm to 2 cm and being positioned side by side so that the rollers have a longitudinal axis substantially parallel to the longitudinal axis of the drum, so that at an apex of rotation of the drum, the two rollers have substantial horizontal longitudinal axes, so that at a nip formed by adjacent surfaces of the rollers, each roller travels downwards for seizing husks of unhusked ears of minicorn, stripping the husks from the ears and pulling the husks between and through the rollers into the interior of the drum;
collecting the husks from the rollers; and
collecting ears stripped of husk from the at least one aperture and adjacent station.

11. A process according to claim 10 wherein the drum has a diameter of from 25 cm to 200 cm and is rotated at from 0.5 rpm to 10 rpm.

12. A process according to claim 11 wherein the drum is rotated by rail wheels upon which the drum is supported and which are connected to and rotated by rotatable axles.

13. A process according to claim 10, 11 or 12 wherein the rollers are rotated by sprockets connected to the rollers and in contact with a stationary ring mounted at one end of the drum so that upon rotation of the drum the sprockets are rotated by the ring for rotating the rollers.

* * * * *

UNITED STATES PATENT AND TRADEMARK OFFICE
CERTIFICATE OF CORRECTION

PATENT NO. : 5,137,493

DATED : August 11, 1992

INVENTOR(S) : Lars Gustaf Albert WADELL, et al

Figure 10:
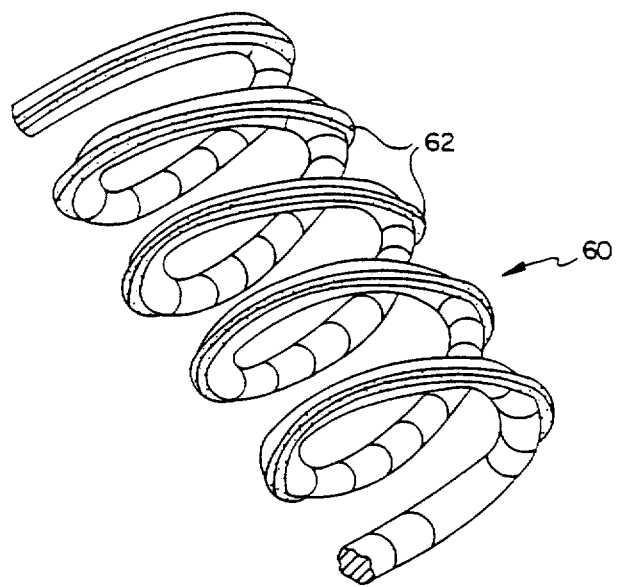

It is certified that error appears in the above-identified patent and that said Letters Patent is hereby corrected as shown below:

Column 2, line 68, insert the following paragraph:

--Figure 10 is a view of a stripping station roller embodied in a form of a spring.--

Column 3, between lines 54 and 55, insert the following:

Illustrated by Figure 10 is a spring 60 which may be employed as a roller in the stripping stations. The spring is configured to have splines 62.--

Figures 1, 5 and 6 should be deleted to appear as per the attached Figures 1, 5 and 6.

Figure 10 should be included to appear as per the attached Figure 10.

Signed and Sealed this

Twelfth Day of October, 1993

Attest:

BRUCE LEHMAN

Attesting Officer     Commissioner of Patents and Trademarks